United States Patent
Gomez

(10) Patent No.: US 7,336,939 B2
(45) Date of Patent: Feb. 26, 2008

(54) INTEGRATED TRACKING FILTERS FOR DIRECT CONVERSION AND LOW-IF SINGLE CONVERSION BROADBAND FILTERS

(75) Inventor: Ramon A Gomez, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 232 days.

(21) Appl. No.: 10/442,260

(22) Filed: May 21, 2003

(65) Prior Publication Data

US 2004/0235445 A1 Nov. 25, 2004

(51) Int. Cl.
*H04B 1/26* (2006.01)

(52) U.S. Cl. .................. 455/307; 455/286; 455/266; 455/179.1; 333/202

(58) Field of Classification Search .............. 455/307, 455/324, 326, 179.1, 180.4, 183.1, 183.2, 455/184.1, 186.1, 187.1, 189.1, 191.2, 197.1; 333/202, 205; 348/192; *H04B 1/26*
See application file for complete search history.

(56) References Cited

U.S. PATENT DOCUMENTS

| | | | |
|---|---|---|---|
| 4,006,420 A | 2/1977 | Schittko | |
| 4,162,452 A | 7/1979 | Ash | |
| 4,340,975 A | 7/1982 | Onishi et al. | |
| 4,408,349 A | 10/1983 | Yukawa | |
| 4,858,159 A | 8/1989 | Wheelwright et al. | |
| 5,200,826 A | 4/1993 | Seong | |
| 5,521,650 A * | 5/1996 | Ku | 348/731 |
| 5,692,279 A | 12/1997 | Mang et al. | |
| 5,715,531 A * | 2/1998 | Liu et al. | 455/307 |

(Continued)

FOREIGN PATENT DOCUMENTS

EP 0473373 A2 3/1992

OTHER PUBLICATIONS

Ducourant et al., "A 3 Chip G&As Double Conversion TV Tuner System With 70 dB Image Rejection," *IEEE 1989 Microwave and Millimeter-Wave Monolithic Circuits Symposium*, pp. 87-90.

(Continued)

*Primary Examiner*—Blane J. Jackson
(74) *Attorney, Agent, or Firm*—Sterne, Kessler, Goldstein & Fox PLLC

(57) ABSTRACT

A radio frequency (RF) tuner includes a programmable tracking filter bank receiving an RF input and outputting a filtered RF signal. A mixer stage receives the filtered RF signal and outputs a first quadrature component of the filtered RF signal and a second quadrature component of the filtered RF signal. Two variable gain amplifiers receive the first and second quadrature components and output amplitude-controlled I and Q components of the filtered RF signal. In one embodiment, the programmable tracking filter bank includes a plurality of tank circuits each connected to the RF input through an impedance. Each tank circuit include an inductor and a capacitor connected in parallel thereby forming an LC network, and a plurality of switched capacitors in parallel with the LC network and switched in and out of the tank circuit by programmable switches. In another embodiment, the programmable tracking filter bank includes a plurality of peaked low-pass circuits each connected to the RF input through an impedance. Each peaked low-pass circuit includes a capacitor connected to ground, and a plurality of switched capacitors in parallel with the capacitor and switched in and out of the peaked low-pass circuit by programmable switches.

36 Claims, 8 Drawing Sheets

U.S. PATENT DOCUMENTS

| | | | |
|---|---|---|---|
| 5,737,035 A | 4/1998 | Rotzoll | |
| 5,822,687 A | 10/1998 | Bickley et al. | |
| 5,847,612 A | 12/1998 | Birleson | |
| 5,930,696 A | 7/1999 | Tzuang et al. | |
| 6,011,962 A | 1/2000 | Lindenmeier et al. | |
| 6,118,499 A * | 9/2000 | Fang | 348/726 |
| 6,163,684 A | 12/2000 | Birleson | |
| 6,453,157 B1 * | 9/2002 | Roberts | 455/337 |
| 6,484,042 B1 | 11/2002 | Loke | |
| 6,795,696 B2 * | 9/2004 | Krug | 455/266 |
| 6,954,115 B2 * | 10/2005 | Wong | 333/17.1 |
| 7,006,162 B2 * | 2/2006 | Cowley et al. | 348/731 |
| 7,095,454 B2 * | 8/2006 | Waight et al. | 348/731 |
| 7,119,834 B2 * | 10/2006 | Englmeier | 348/192 |
| 2003/0025841 A1 * | 2/2003 | Sawyer | 348/734 |
| 2003/0027543 A1 * | 2/2003 | Takaki | 455/324 |
| 2003/0156661 A1 * | 8/2003 | Nakamura | 375/316 |
| 2003/0220088 A1 * | 11/2003 | Cowley et al. | 455/292 |
| 2004/0063415 A1 * | 4/2004 | Python et al. | 455/307 |
| 2004/0116096 A1 * | 6/2004 | Shen | 455/323 |
| 2004/0125240 A1 * | 7/2004 | Stikvoort et al. | 348/731 |

OTHER PUBLICATIONS

Farmer, "Specifications for Tuner Design for Use in Cable Ready Television Receivers and VCRs," *IEEE Transactions on Consumer Electronics*, vol. 36, No. 3, Aug. 1990, pp. 660-668.

Maas, "Microwave Mixers," Artech House, Copyright, 1986, pp. 248-251.

\* cited by examiner

US 7,336,939 B2

INTEGRATED TRACKING FILTERS FOR DIRECT CONVERSION AND LOW-IF SINGLE CONVERSION BROADBAND FILTERS

BACKGROUND OF THE INVENTION

1. Field of the Invention

The present invention relates to radio frequency (RF) receivers, and more particularly, to RF receivers with tracking filter banks for single conversion broadband filters.

2. Description of the Related Art

Direct-conversion, or homodyne, receivers are popular for many communications applications because of their simplicity and low power. They do not require intermediate-frequency (IF) filters, which are often costly, and need only one frequency conversion stage and one local oscillator (LO).

Direct-conversion receivers rely entirely on quadrature mixing to obtain the necessary image rejection. Single-conversion low-IF receivers for broadband communication systems, such as direct broadcast satellite (DBS), broadcast or cable television (CATV), may rely on some combination of quadrature conversion and pre-selection with tracking or switched filters.

Double-conversion receivers for these applications rely more on IF filtering for image rejection. Because the IF frequencies can be fixed, very sharp filters, such as surface acoustic wave (SAW) filters, need to be used. However, these filters are relatively costly.

Difficulties in integrating tracking filters and in achieving the necessary degree of image rejection through quadrature balance have heretofore prevented the implementation of integrated direct-conversion receivers for broadcast television and CATV. Integrated single-conversion low-IF tuners generally do not include the tracking filters.

A typical conventional single-conversion tuner is illustrated in FIG. 1. As shown in FIG. 1, the conversion tuner includes a bank of bandpass filters 101a, 101b, 101c (in this example, three filters) that receive RF input. The output of the bandpass filters 101 is fed into a low-noise amplifier 104, and then to a mixer 109. The tuner also includes a phase-lock loop (PLL) 120, which is comprised of a phase-lock loop controller 105, and voltage controlled oscillators (VCOs) 106a, 106b, 106c. Each VCO 106 is matched to a corresponding bandpass filter 101. The output of a phase-lock loop controller 105 controls the filters 101 and the voltage control oscillators 106. The outputs of the VCOs 106 are also inputted into the mixer 109.

As further illustrated in FIG. 1, the output of the mixer 109 is received by a variable gain amplifier (VGA) 110, which is placed in a feedback loop that includes a power detector 111. The output of the variable gain amplifier 110 then is inputted to a downstream demodulator (not shown in FIG. 1).

Thus, each tracking filter 101 is slaved to a corresponding voltage-controlled oscillator (VCO) 106a, 106b, 106c, which produces the local oscillator (LO) for the first frequency conversion when that filter 101 is selected. The choice of filter 101 and VCO 106 depends on the frequency of the desired channel, and is determined by a digital command. By using matched components, such as inductors, capacitors, and voltage-variable capacitors (varactors) in the VCO 106 and filter 101, the center frequency of each filter 101 can be matched to the frequency of the corresponding VCO 106. This arrangement is illustrated in FIG. 2.

As shown in FIG. 2, each bandpass filter 101 can include an inductor L205, a capacitor C207, a varactor diode D208, and a capacitor C206, connected as shown. Choke inductors L204 are used to prevent leakage of RF signals back upstream. As further shown in FIG. 2, the voltage control oscillator 106 includes active components 202, and passive components L210, C212, D213, and C211, connected as shown. A choke L209 similarly prevents leakage of RF signals back upstream from the VCO 106.

A secondary problem in direct-conversion tuners are the responses at the LO harmonics, as shown in the bottom graph of FIG. 1. For a narrowband communication system, where the input spectrum spans less than one octave, this is not a problem. There are no signals to be received at the frequencies corresponding to the LO harmonics. Any unwanted signals can in principle be removed with a fixed filter. But for wideband communication systems such as CATV and terrestrial broadcast television, this issue must be addressed. For example, for a TV channel at 50 Mhz, there is an unwanted harmonic response at 150 Mhz, as shown in FIG. 1.

SUMMARY OF THE INVENTION

The present invention is directed to integrated tracking filters for direct conversion and low-IF single conversion broadband filters that substantially obviates one or more of the problems and disadvantages of the related art.

There is provided a radio frequency (RF) tuner including a programmable tracking filter bank receiving an RF input and outputting a filtered RF signal. A mixer stage receives the filtered RF signal and outputs a first quadrature component of the filtered RF signal and a second quadrature component of the filtered RF signal. Two variable gain amplifiers receive the first and second quadrature components and output amplitude-controlled I and Q components of the filtered RF signal. In one embodiment, the programmable tracking filter bank includes a plurality of tank circuits each connected to the RF input through an impedance. Each tank circuit includes an inductor and a capacitor connected in parallel, thereby forming an LC network, and a plurality of switched capacitors in parallel with the LC network and switched in and out of the tank circuit by programmable switches. In another embodiment, the programmable tracking filter bank includes a plurality of peaked low-pass circuits each connected to the RF input through an impedance. Each peaked low-pass circuit includes a capacitor connected to ground, and a plurality of switched capacitors in parallel with the capacitor and switched in and out of the peaked low-pass circuit by programmable switches.

In another aspect there is provided a radio frequency (RF) tuner including a programmable tracking filter bank receiving a differential RF input and outputting a filtered RF differential signal. A mixer stage receives the filtered differential RF signal and outputs a first quadrature component of the filtered differential RF signal and a second quadrature component of the filtered differential RF signal. Two variable gain amplifiers receive the first and second quadrature components, and output amplitude-controlled I and Q components of the filtered differential RF signal.

In another aspect there is provided a radio frequency (RF) receiver including a tuner receiving an RF input and outputting amplitude controlled I and Q components of the RF input. A demodulator converts the I and Q components to a TV channel signal. A power detector receives the demodulated TV channel signal, and outputs a control signal to a filter control circuit. The filter control circuit controls the tuner. The tuner includes a programmable tracking filter bank receiving the RF input and outputting a filtered RF signal based on output of the filter control circuit. A mixer stage receives the filtered RF signal and outputs a first quadrature component of the filtered RF signal and a second quadrature component of the filtered RF signal. Two variable gain amplifiers receive the first and second quadrature components and output the amplitude-controlled I and Q components of the filtered RF signal.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGS

The accompanying drawings, which are included to provide a further understanding of the exemplary embodiments of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings.

This invention describes techniques for implementing tunable tracking filters for RF applications, suitable for conventional integrated circuits, with minimal off-chip components. In particular, this invention discloses a technique for implementing tunable tracking filters suitable for image and LO harmonic response rejection in integrated broadband tuners.

Figure 1:
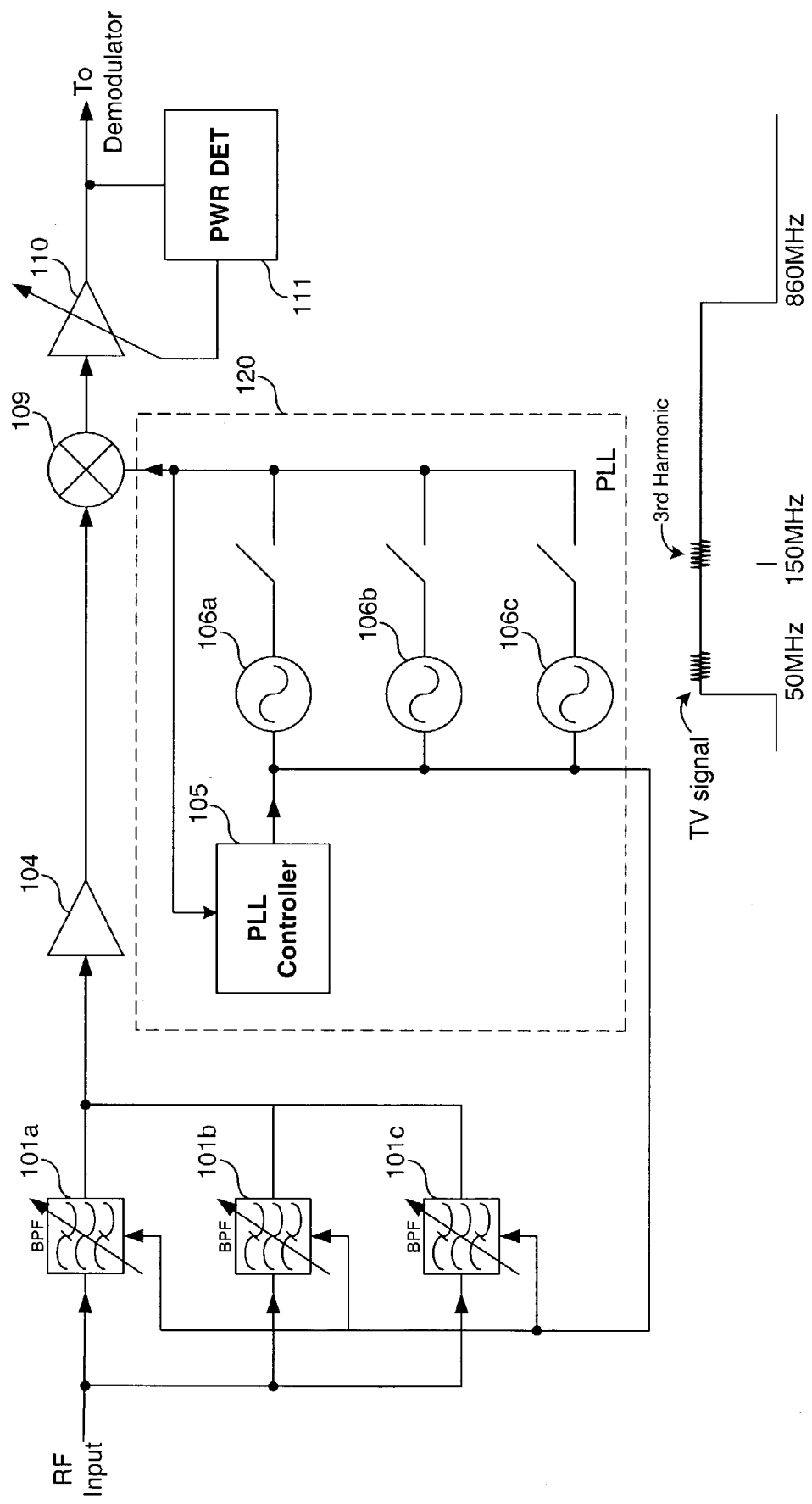
FIG. 1 shows a conventional single conversion tuner with a tracking filter bank.
Figure 2:
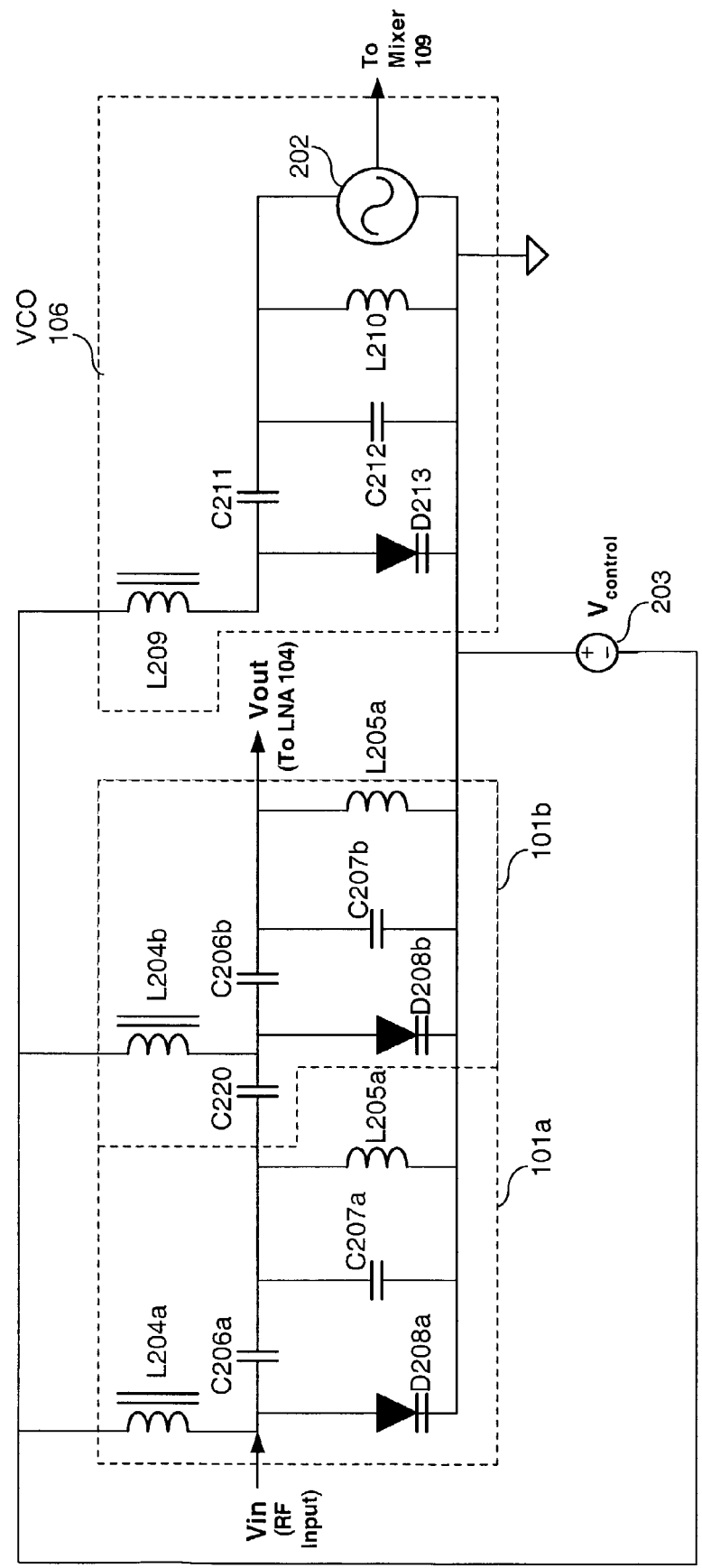
FIG. 2 shows tracking filters matched to a voltage controlled oscillator.
Figure 3:
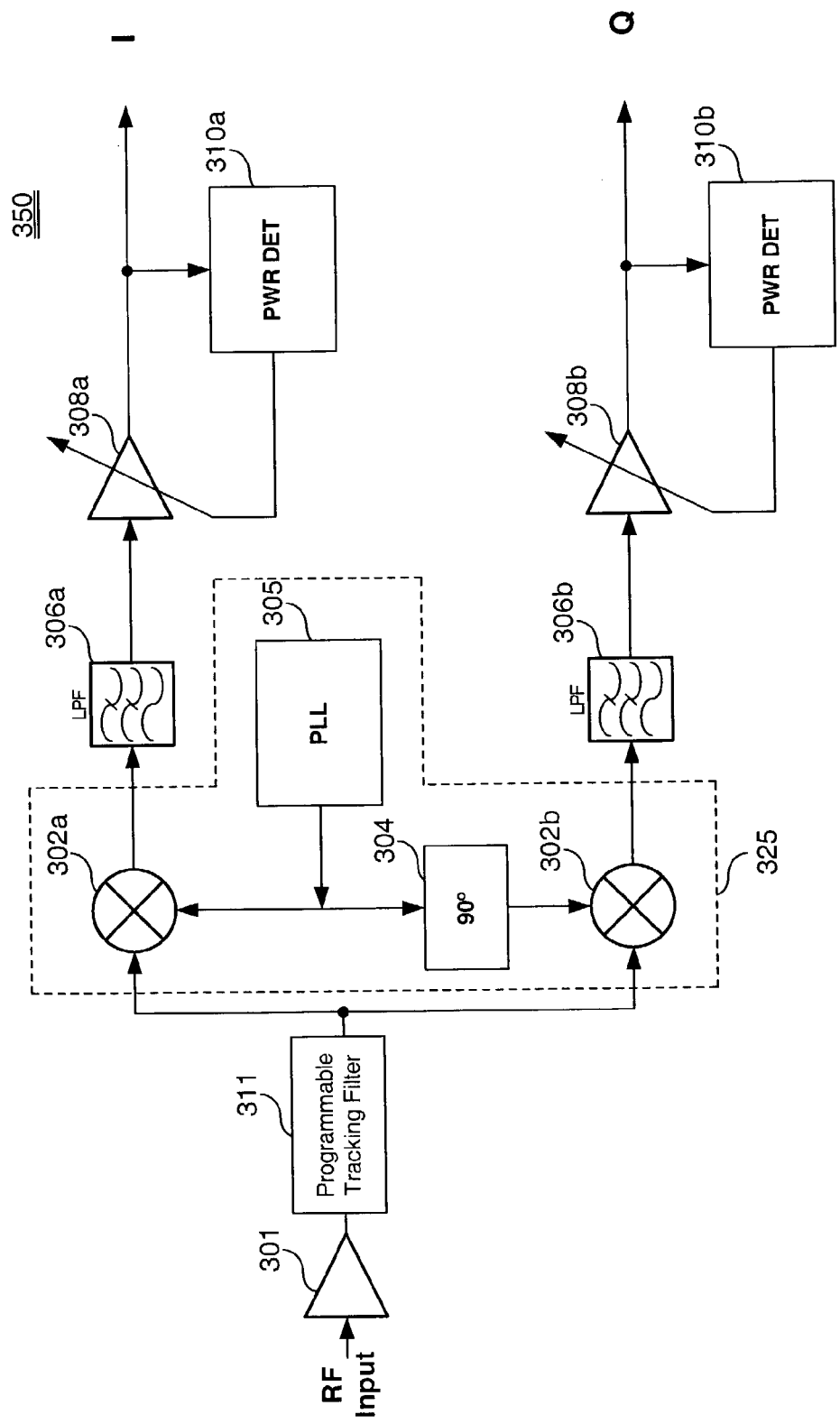
FIG. 3 shows a direct conversion tuner of the present invention.

A direct-conversion tuner 350 of the present invention is shown in FIG. 3. In this case, the IF frequency is zero, so tracking filters cannot be used to provide image rejection. Quadrature mixers with adequate balance are therefore necessary.

As shown in FIG. 3, the tuner 350 according to the present invention includes a low-noise amplifier (LNA) 301 receiving RF input. Typical RF input is a television signal. In the U.S., the signal occupies 50-860 megahertz spectral range and carries a plurality of 6 MHz bandwidth channels. The output of the low-noise amplifier 301 is fed into a bank of programmable tracking filters 311, then to two mixers 302a, 302b. The purpose of the programmable filter bank 311 is to suppress RF at harmonics of the phase-lock loop 305, so that the overall circuit has no response at those frequencies. A phase-lock loop (PLL) 305 outputs a waveform to the mixer 302a and to a 90° phase shifter 304. The phase shifter 304 outputs a shifted waveform from the PLL 305 to the mixer 302b. Collectively, the PLL 305, the phase shifter 304 and the mixers 302a, 302b may be referred to as a mixer stage 325.

The outputs of the mixers 302a, 302b are fed into low-pass filters 306a, 306b respectively. A typical low-pass filter 306 might have a bandwidth of 3 MHz, for the U.S. standard of 6 MHz per TV channel. The low-pass filters 306a, 306b output their filtered signals to variable gain amplifiers (VGAs) 308a, 308b. The variable gain amplifiers 308a, 308b are controlled by power detection circuits 310a, 310b respectively, arrayed in feedback loops. The VGAs 308a, 308b also output the I and the Q quadrature components of the TV signal.

Figure 4:
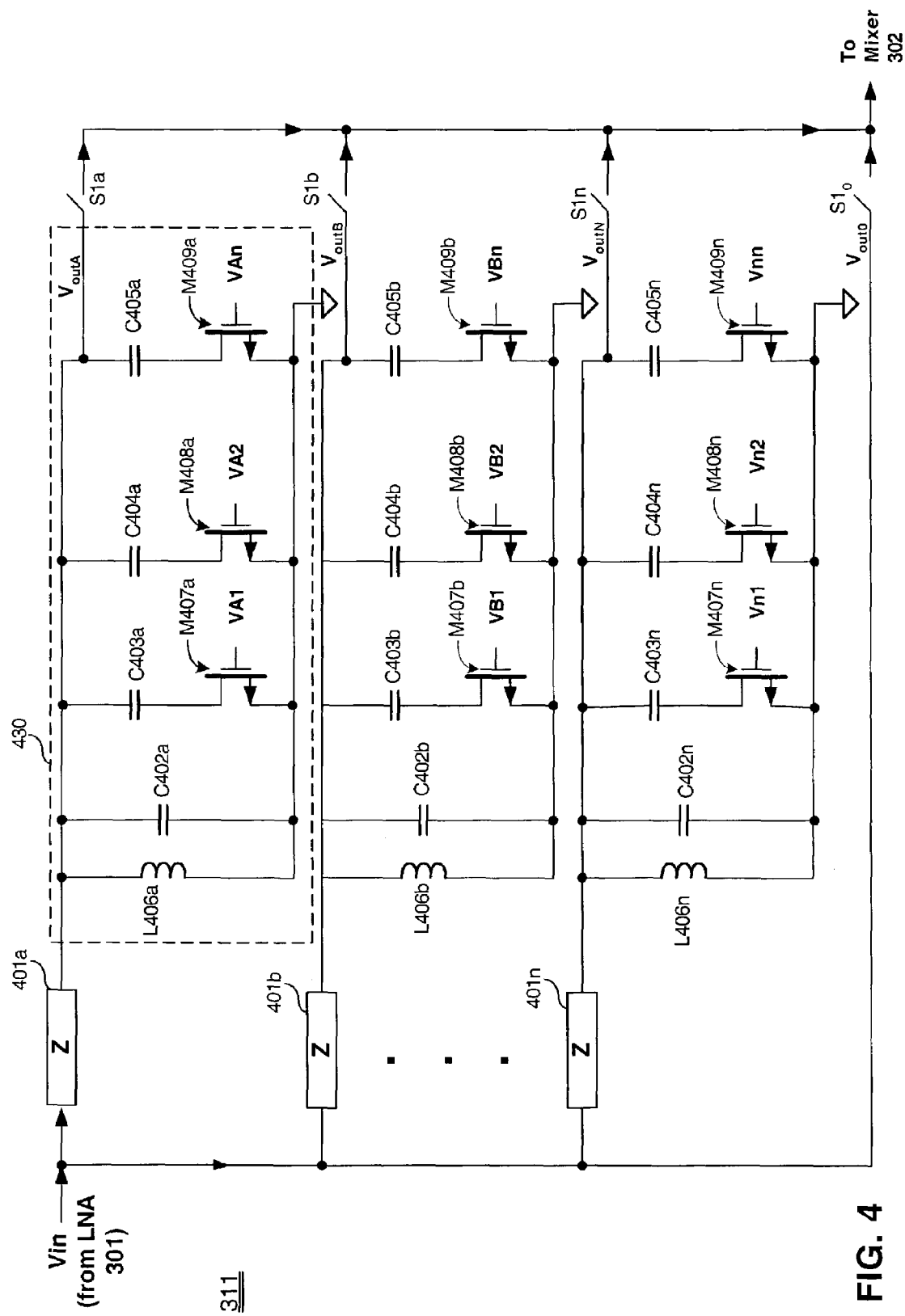
FIG. 4 shows one embodiment of a splitter and tunable filter bank.

FIG. 4 illustrates the bank of tunable filters 311 of one embodiment of the present invention. As shown in FIG. 4, the bank of tunable filters 311 includes a plurality of impedances 401a, 401b . . . 401n, which may be, e.g., inductors. Each tunable filter also includes a tank circuit (i.e., a band pass filter) 430, which does not need to be as sharp a filter as a filter needed for image rejection. Note that each tank circuit 430 covers a particular range of the TV spectrum. Each tank circuit 430 includes an inductor L406, a capacitor C402, and switchable capacitors C403, C404, C405 (only three are shown in FIG. 4, but more or fewer may be used), which are switched in and out of the circuit by switches (e.g., transistors) M407, M408, M409. Note that in a typical circuit, the inductor L406 is usually an on-board inductor, whereas the rest of the tank circuit 430 can be manufactured as an integrated circuit. Generally, however, the inductors L406 may be discrete, or printed.

The outputs $V_{OUTA}, V_{OUTB} \ldots V_{OUTN}$ are outputted through switches S1, and are summed and outputted to the mixer stage 325 of FIG. 3. Note that the output $V_{OUTO}$ represents the higher frequencies, and in a typical TV tuner circuit harmonics higher than second or third are usually not a concern. Thus, there is usually no need for filters above approximately 280-300 MHz. The frequency-selective circuit of each tank circuit 430 is a single parallel LC tuned circuit. The inductor L406 may be on-chip or off-chip, as noted above, although off-chip inductors generally are available with higher Q factors and give better performance. The capacitance element C402 is tuned on-chip. The small capacitive elements C403, C404, C405 may be connected or disconnected from the tuned circuit using integrated transistor switches (M407, M408, M409). There will be some amount of fixed parasitic capacitance, both on-chip and off-chip. There may also be some amount of intentional capacitance, either on-chip or off-chip.

The inputs of the tank circuits 430 are connected to a common input through impedances 401 (e.g., inductors). This prevents interaction between the tuned circuits. This arrangement is essentially a frequency multiplexor, with one common input $V_{in}$ and multiple outputs $V_{OUTA}, V_{OUTB}, \ldots V_{OUTN}$, such that each output passes a different frequency band. Generally, the tank circuits 430 are tunable over overlapping ranges covering the entire input range.

If the tank circuits 430 are being used for image-rejection, they must provide sufficient attenuation at an offset from the desired frequency equal to twice the IF frequency, for all input frequencies. If they are being used for rejection of harmonic responses, they need only provide sufficient attenuation at the unwanted harmonic of the input frequency. For instance, for a TV channel at 62 Mhz, the harmonic of primary concern is at 186 Mhz, thus, it is most important to reject input at 186 Mhz, in this case. As noted above, no filtering is necessary for frequencies greater than the maximum input frequency divided by the order of the lowest significant harmonic response. This significantly simplifies the architecture of the programmable filter bank 311.

In FIG. 4, the multiple outputs $V_{OUTA}$-$V_{OUTN}$ are recombined to a single signal driving the first mixing stage 302a, 302b with switches S1a, S1b ... S1n. Each tank circuit 430 output may be connected or disconnected from the first mixing stage 302a, 302b using, e.g., an integrated transistor switch.

Alternatively, each tank circuit 430 output can drive an independent amplifier or mixer stage, whose outputs will be combined to drive the subsequent stages of the tuner 350.

The number of tank circuits 430 in the filter bank 311 is determined by the total frequency range that must be covered, and by the tuning range of each tank circuit 430. The inductance L of the inductor L406 and the maximum and minimum capacitance $C_{max}$ and $C_{min}$ of the capacitor C402 that can be realized in parallel determine the tuning range of a given tank circuit 430. $C_{min}$ is determined by the parasitic capacitances on and off the chip, including printed circuit board (PCB) wiring traces, inductor parasitics, IC bond pad parasitics, and the parasitic capacitance of the integrated transistor switches (M407-M409) that are used to vary the capacitance.

Let $C_0$ (not designated in FIG. 4) be the fixed parasitic capacitance. Let $C_{SW}$ (also not designated in FIG. 4) be the parasitic capacitance of a unit-sized transistor switch. The size of each switch must be large enough so that the Q of the tuned circuit, and consequently the frequency response of the corresponding tank circuit 430, are not unacceptably degraded by the switch resistance. Let W be the minimum acceptable switch size relative to a unit switch. Then its parasitic capacitance is $WC_{SW}$. W is in turn approximately proportional to the switched capacitance. Therefore, $$C_{max} = C_{min} + C_{DELTA}$$

$$C_{min} = C_0 + WC_{SW}$$

$$= C_0 + kC_{DELTA}C_{SW}$$

$$f_{min}/f_{max} = \sqrt{\frac{C_{max}}{C_{min}}}$$

$$= \sqrt{\frac{C_0 + kC_{DELTA}C_{SW} + C_{DELTA}}{C_0 + kC_{DELTA} \cdot C_{SW}}}$$

$$= \sqrt{1 + \frac{C_{DELTA}}{C_0 + kC_{DELTA} \cdot C_{SW}}} \sim$$

$$= \sqrt{1 + \frac{1}{kC_{SW}}} \text{ when } C_{DELTA} \text{ is large}$$

Thus, it is desirable that k, the proportionality factor between the switched capacitance and the parasitic capacitance of a transistor switch be large enough to connect or disconnect it from the circuit without excessive Q degradation. This requirement favors high-speed integrated circuit processes with very small parasitic capacitances for a given amount of switch conductance. Note that either bipolar or field-effect transistors may be used as switches. The long recovery time from saturated operation if bipolar transistors are used is not relevant, since the rate at which the tank circuit 430 center frequency will need to be tuned is typically quite slow.

Thus, the tracking filters 311 described herein may be used to eliminate image responses as well as responses at the harmonics of the LO frequency, which cause undesirable interference in the RF receiver. For example, in the case of a channel at 50 Mhz, the tracking filters 311 eliminate the responses at the harmonics of 50 Mhz, particularly the odd harmonics (e.g., 150 Mhz, etc.)

Figure 5:
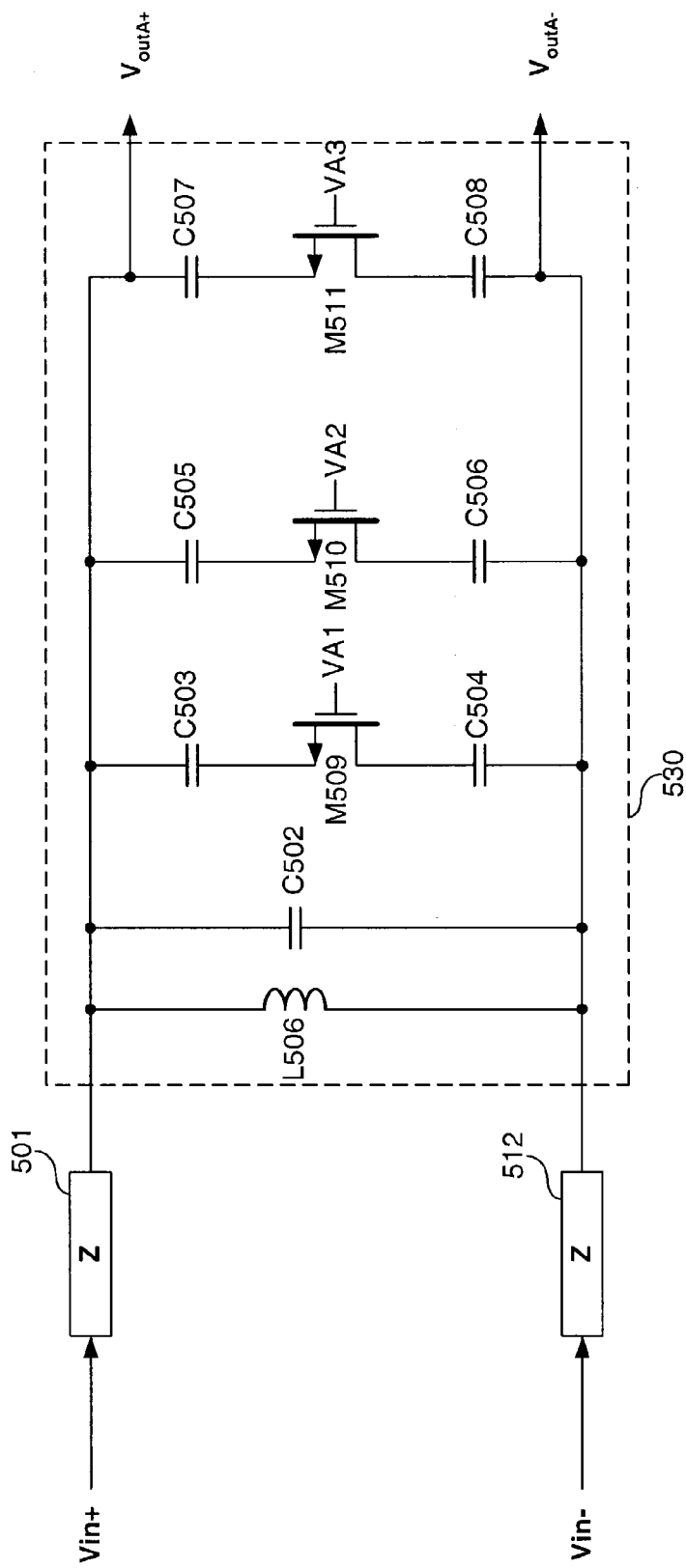
FIG. 5 shows an example of one element of a differential filter bank.

FIG. 5 illustrates an element of the filter bank 311 in differential form. Although the differential version requires additional components, it may be preferred for superior distortion performance and crosstalk immunity. As shown in FIG. 5, the differential form of each of the tracking filters 530 that can be used and the filter bank 311 includes impedances 501 and 512, which receive the input signals Vin+ and Vin−. The signal then is inputted into the tracking filter 530 that includes an inductor L506, a capacitor C502, and a plurality of capacitors C503, C504; C505, C506; and C507, C508, which are switched in and out of the circuit to control the center frequency of the circuit by transistors M509, M510, M511, respectively. The outputs of the filter 530 are the $V_{OUTA}$+ and $V_{OUTA}$− as shown in FIG. 5.

Further with reference to FIG. 4, an additional requirement is that the center frequency of each tank circuit 430 be essentially the same as the desired channel. Because of component tolerances, it may not be possible to know in advance how many of the switched capacitance elements C403, C404, C405 must be connected for a given center frequency. In this case, some form of feedback control is necessary to tune the tank circuit 430 properly. This may be accomplished using the arrangement illustrated in FIG. 6, where the baseband power detector, generally present in most communication receivers as part of the automatic gain control function, indicates the amplitude of the desired channel downstream of all tuner processing. The tunable filter bank 311 can be swept over a sufficient range, and the sweep is concluded when the baseband power detector 604 indicates a maximum signal amplitude, corresponding to a well-centered filter.

Figure 6:
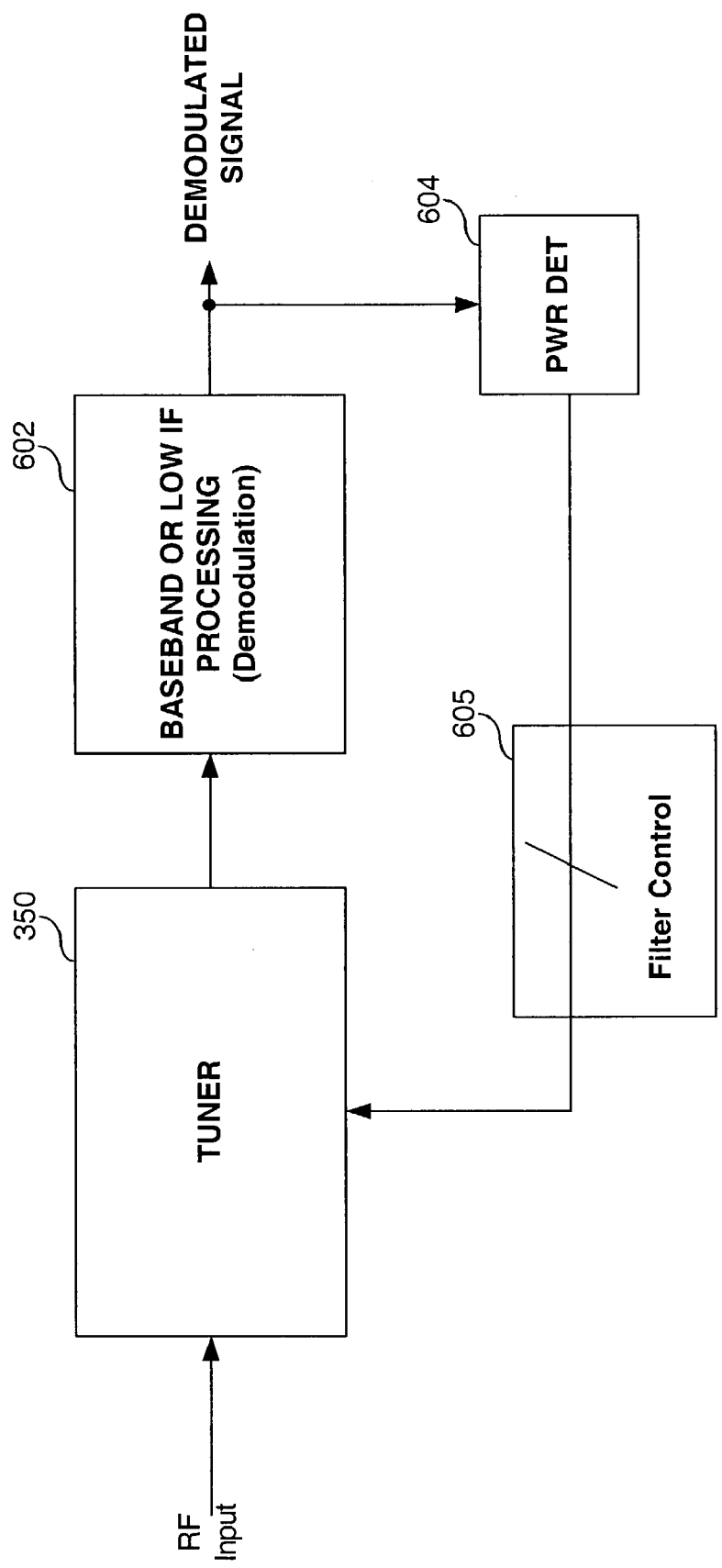
FIG. 6 shows filter centering through baseband (or low-IF) power detection.

FIG. 6 illustrates how the tuner 350 of the present invention is used in an overall receiver. As shown in FIG. 6, the RF input is received by the tuner 350. The tuner 350 then outputs the I and the Q components of the signal to a baseband or low-IF processing circuit 602 (i.e., a demodulator). The demodulated signal, which represents a single TV channel, is then fed further downstream. A power detect circuit 604 is used in a closed loop manner to center the filter bank 311 of the tuner 350. The power detect circuit 604 detects the power at the desired TV channel. A filter control circuit 605 controls the gates of the transistors of the tracking filters, so as to maximize the power of the desired channel detected by the power detect circuit 604, as shown in FIGS. 4, 5 and 7.

Figure 7:
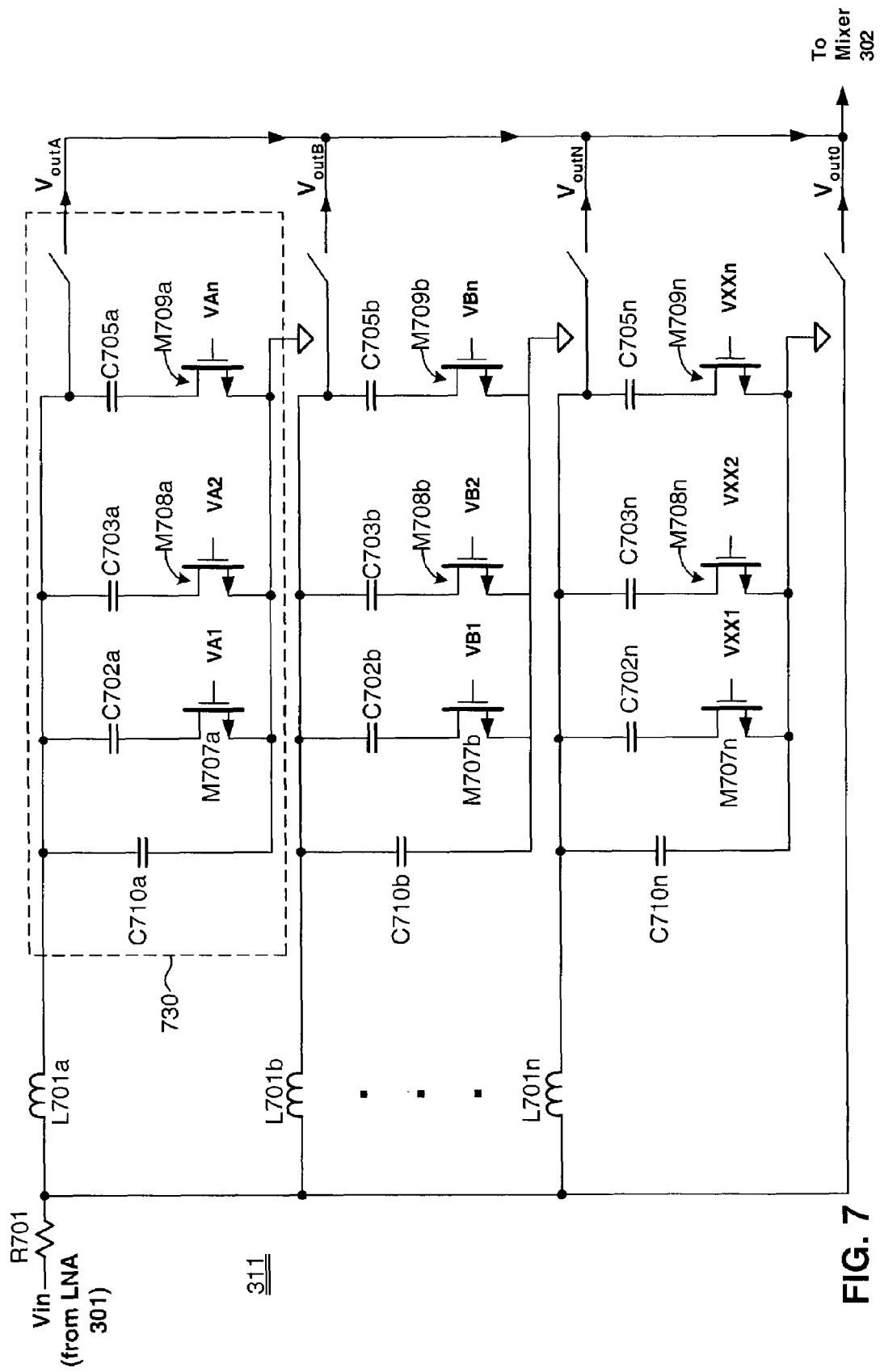
FIG. 7 shows another embodiment of a splitter and tunable filter bank using peaked low-pass sections.
Figure 8:
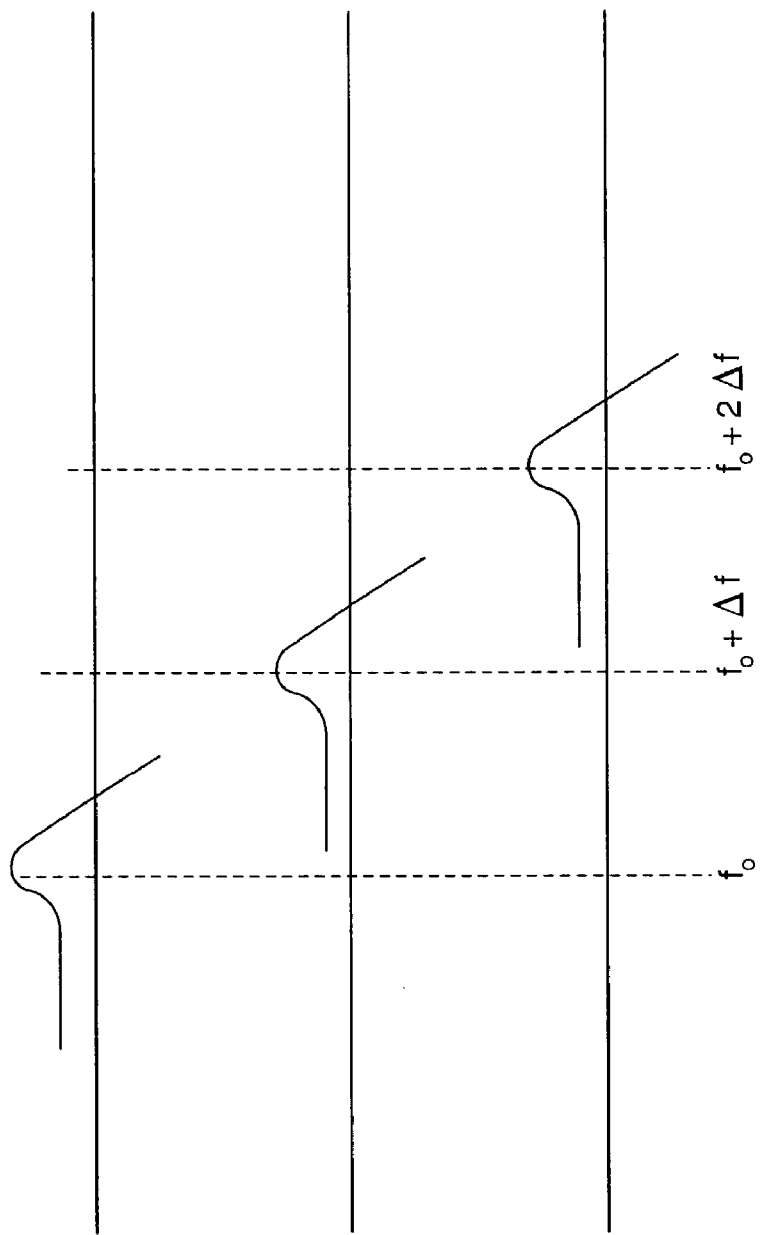
FIG. 8 shows a frequency response of the peaked low pass sections of FIG. 7.

FIG. 7 illustrates an alternative circuit configuration of the filter bank 311 that uses peaked second-order low-pass sections 730, which can provide the desired filtering action while saving one (in the case of a single-ended section) or two (in the case of a differential section) inductors per section. As shown in FIG. 7, the RF input is received through a resistor R701. Each section 730 includes a capacitor C710, and capacitors C702, C703, C705 (three in this example), which are switched in and out of the circuit by programmable switches (e.g., transistors) M707, M708 and M709. The filter bank 311 shown in FIG. 7 functions similarly to the filter bank of FIG. 4, except that it does not use an extra inductor and may be made more compact and better integrated into a single IC. FIG. 8 shows a frequency response of the peaked low pass sections of FIG. 7. In FIG. 8 shows the peaked low pass responses at a certain frequency (e.g., $f_0$=50 Mhz) of three sections. One response would be selected as an input to the mixer. Alternatively, with multiple mixers, each response goes to a particular mixer.

In the case of the peaked low pass architecture, it is preferable that the impedance of integrated circuit at each tank circuit 430 output be capacitive, to facilitate a high Q frequency response with low loss and good selectivity.

Thus, as discussed above, the present invention permits centering using a baseband power detector. Furthermore, the present invention permits the use of a filter bank with switched tuning implemented on-chip. Additionally, the present invention permits filter outputs to be connected to downstream signal path with switches, or multiple filter outputs driving multiple amplifier or mixer stages, which are then combined. Thus, the present invention permits reducing the number of external components, does not require discrete varactors, and does not rely on critical component matching.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Also, the order of method steps may be rearranged. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A radio frequency (RF) tuner comprising:
a programmable tracking filter bank receiving an RF input and outputting a filtered RF signal, wherein the programmable tracking filter bank includes a plurality of tank circuits each connected to the RF input through an impedance, each tank circuit including:
an LC network;
a plurality of switched capacitors in parallel with the LC network and switched in and out of the tank circuit by programmable switches;
a mixer stage receiving the filtered RF signal and outputting a first quadrature component of the filtered RF signal and a second quadrature component of the filtered RF signal; and
two variable gain amplifiers receiving the first and second quadrature components and outputting amplitude-controlled I and Q components of the filtered RF signal,
wherein the programmable tracking filter bank is tuned based on a power level of the amplitude-controlled I and Q components of the filtered RF signal.

2. The tank circuit of claim 1, wherein the programmable switches are field effect transistors.

3. The tank circuit of claim 1, wherein the programmable switches are bipolar transistors.

4. The tuner of claim 1, wherein one output of the tank circuits is selected to be inputted into the mixer stage.

5. The tuner of claim 1, further comprising a plurality of mixer stages receiving the filtered RF signal and each outputting a first quadrature component of the filtered RF signal and each outputting a second quadrature component of the filtered RF signal,
wherein an output of each tank circuit is inputted into a corresponding mixer stage, and
wherein an output of one of the mixer stages is selected to be inputted to the two variable gain amplifiers.

6. The tuner of claim 1, wherein the impedance is an inductor.

7. The tuner of claim 1, wherein outputs of the tank circuits are summed before being inputted into the mixer stage.

8. The tuner of claim 1, further comprising a low noise amplifier at an input to the programmable tracking filter bank.

9. The tuner of claim 1, further comprising two power detection circuits for controlling gain of the two variable gain amplifiers.

10. The tuner of claim 1, wherein the programmable tracking filter bank includes a plurality of peaked low-pass circuits each connected to the RF input through an impedance, each peaked low-pass circuit including:
a capacitor connected to ground;
a plurality of switched capacitors in parallel with the capacitor and switched in and out of the peaked low-pass circuit by programmable switches.

11. The tuner of claim 1, wherein the mixer stage directly converts the RF input down to a baseband signal.

12. The tuner of claim 1, wherein the mixer stage uses a single stage to convert the RF input down to a baseband signal.

13. The tuner of claim 1, wherein the mixer stage uses a single stage to convert the RF input down to an intermediate frequency signal.

14. The tuner of claim 1, wherein the programmable tracking filters reject frequencies in the RF input that are harmonics of a local oscillator of the mixer stage.

15. The tuner of claim 14, wherein the harmonics are odd harmonics.

16. The tuner of claim 14, wherein the harmonics include the third harmonic.

17. A radio frequency (RF) tuner comprising:
a programmable tracking filter bank receiving a differential RF input and outputting a filtered RF differential signal, wherein the programmable tracking filter bank includes a plurality of tank circuits each connected to the differential RF input through two impedances, each tank circuit including:
an LC network connected between Vin+ and Vin− of the differential RF input;
a plurality of switched capacitors in parallel with the LC network and switched in and out of the tank circuit by programmable switches;
a mixer stage receiving the filtered differential RF signal and outputting a first quadrature component of the filtered differential RF signal and a second quadrature component of the filtered differential RF signal; and
two variable gain amplifiers receiving the first and second quadrature components and outputting amplitude-controlled I and Q components of the filtered differential RF signal;
wherein the programmable tracking filter bank is tuned based on a power level of the amplitude-controlled I and Q components of the filtered RF signal.

18. The tuner of claim 17, further comprising a plurality of mixer stages receiving the filtered RF signal and each outputting a first quadrature component of the filtered RF signal and each outputting a second quadrature component of the filtered RF signal,
wherein an output of each tank circuit is inputted into a corresponding mixer stage, and
wherein an output of one of the mixer stages is selected to be inputted to the two variable gain amplifiers.

19. The tank circuit of claim 17, wherein the programmable switches are field effect transistors.

20. The tank circuit of claim 17, wherein the programmable switches are bipolar transistors.

21. The tuner of claim 17, wherein one output of the tank circuits is selected to be inputted into the mixer stage.

22. The tuner of claim 17, further comprising a low noise differential amplifier at an input to the programmable tracking filter bank.

23. The tuner of claim 17, further comprising two power detection circuits for controlling gain of the two variable gain amplifiers.

24. The tuner of claim 17, wherein the programmable tracking filter bank includes a plurality of peaked low-pass circuits each connected to the differential RF input through impedances, each peaked low-pass circuit including:
a tuning capacitor connected as a shunt;
a plurality of switched capacitors in parallel with the tuning capacitor and switched in and out of the peaked low-pass circuit by programmable switches.

25. The tuner of claim 17, wherein the mixer stage uses a single stage to convert the RF input down to a baseband signal.

26. The tuner of claim 17, wherein the programmable tracking filters reject frequencies in the RF input that are harmonics of a local oscillator of the mixer stage.

27. The tuner of claim 26, wherein the harmonics are odd harmonics.

28. The tuner of claim 26, wherein the harmonics include the third harmonic.

29. A radio frequency (RF) receiver comprising:
a tuner receiving an RF input and outputting amplitude controlled I and Q components of the RF input;
a demodulator converting the I and Q components to a signal channel;
a power detector receiving the demodulated signal, and outputting a control signal to a filter control circuit, wherein the filter control circuit controls the tuner, wherein the tuner includes:
a programmable tracking filter bank receiving the RF input and outputting a filtered RF signal based on output of the filter control circuit, wherein the programmable tracking filter bank includes a plurality of peaked low-pass circuits each connected to the RF input through an impedance, each peaked low-pass circuit including:
a tuning capacitor connected to ground;
a plurality of switched capacitors in parallel with the tuning capacitor and switched in and out of the peaked low-pass circuit by programmable switches,
a mixer stage receiving the filtered RF signal and outputting a first quadrature component of the filtered RF signal and a second quadrature component of the filtered RF signal, and
two variable gain amplifiers receiving the first and second quadrature components and outputting the amplitude-controlled I and Q components of the filtered RF signal.

30. The receiver of claim 29, wherein the programmable tracking filter bank includes a plurality of tank circuits each connected to the RF input through an impedance, each tank circuit including:
an inductor and a capacitor connected in parallel thereby forming an LC network;
a plurality of switched capacitors in parallel with the LC network and switched in and out of the tank circuit by programmable switches.

31. The receiver of claim 29, further comprising two power detection circuits for controlling gain of the two variable gain amplifiers.

32. The tuner of claim 29, wherein the mixer stage uses a single stage to convert the RF input down to a baseband signal.

33. The tuner of claim 29, wherein the mixer stage uses a single stage to convert the RF input down to an intermediate frequency signal.

34. The tuner of claim 29, wherein the programmable tracking filters reject frequencies in the RF input that are harmonics of a local oscillator of the mixer stage.

35. The tuner of claim 34, wherein the harmonics are odd harmonics.

36. The tuner of claim 34, wherein the harmonics include the third harmonic.

* * * * *